No. 832,233. PATENTED OCT. 2, 1906.
R. C. BOWERS & L. A. BERGER.
CENTRIFUGAL SPEED REGULATOR.
APPLICATION FILED MAY 12, 1905.
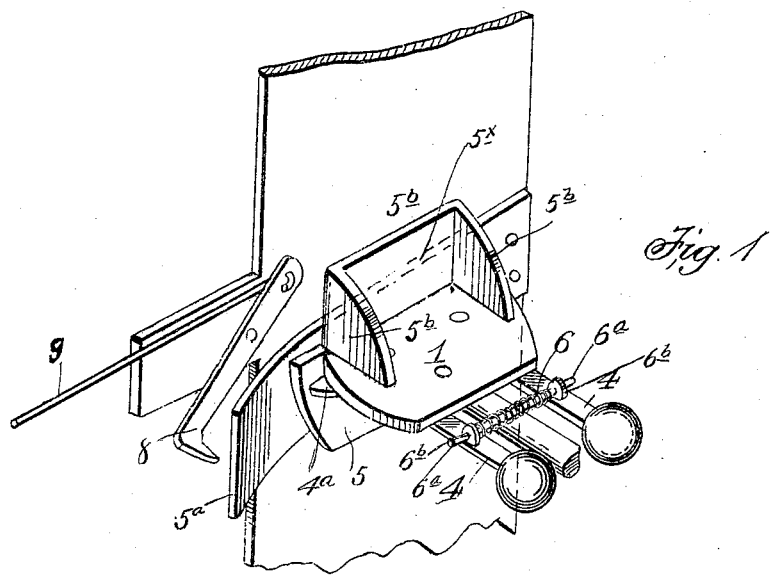
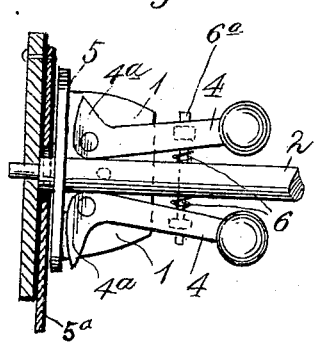
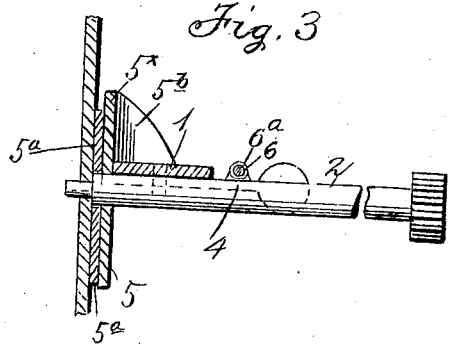
Witnesses:
Inventors:
Rudolph C. Bowers.
Lewis A. Berger,
By Lewis Bagger & Co.,
Attorneys

UNITED STATES PATENT OFFICE.

RUDOLPH C. BOWERS AND LEWIS A. BERGER, OF EAST RINGGOLD, OHIO.

CENTRIFUGAL SPEED-REGULATOR.

No. 832,233.          Specification of Letters Patent.          Patented Oct. 2, 1906.

Application filed May 12, 1905. Serial No. 260,136.

*To all whom it may concern:*

Be it known that we, RUDOLPH C. BOWERS and LEWIS A. BERGER, citizens of the United States, residing at East Ringgold, in the county of Pickaway and State of Ohio, have invented new and useful Improvements in Centrifugal Speed-Regulators, of which the following is a specification.

Our invention pertains to improvements in centrifugal speed-regulators. Its objects are to secure convenience and facility in applying the governor and to provide thereby for the effective control of the machinery in connection with which it may be used.

It consists of the structural features substantially as hereinafter fully disclosed, and particularly pointed out by the claims.

In the accompanying drawings, illustrating the preferred embodiment of our invention, Figure 1 is a broken perspective view thereof. Fig. 2 is a sectional view, and Fig. 3 is a like view of the same.

In the disclosure of our invention, we suitably pivot in position upon a base, plate 1, fixed or brazed to a driven shaft 2, weighted arms or levers 4, whose inner cam-ended portions $4^a$ are adapted to engage a plate 5, supported upon said shaft, but not controlled thereby, the action or effect of which will presently appear, said plate itself being normally in contact with a second plate $5^a$, presently again referred to. The plate 5 has an upward extension $5^x$, provided with lateral portions $5^b$, resting upon the aforesaid plate 1 for guiding or controlling the plate 5 when moved as in manually controlling the governor, as later explained. Said arms 4 are normally controlled by the action of a preferably helical spring 6 encompassing or applied to a rod $6^a$ and having its ends connected to said governor-arms, said rod sliding or resting in eye-studs $6^b$, projecting from the latter. It will therefore be noted that when the speed of the shaft 2 increases the governor-arms 4, with their ball ended or weighted portions, will be thrown outward by centrifugal action, accordingly causing their inner ends to engage or impinge upon plate 5 normally in contact with the practically fixed plate $5^a$, thus resulting in retarding or slowing "down" the motion of the driven shaft 2, as is apparent. Responsive to this retardation of the shaft 2 the helical spring 6 will exert its recoil action or pressure to return the governor-arms 4 to their normal position, and thus restore the shaft-speed to normal, as will be readily understood. Said second plate $5^a$, which is of spring metal, and also normally in contact with and secured at one end to a stationary part—as, for instance, that upon which the shaft 2 is journaled—is effective to be brought into engagement or frictional contact with the plate 5 when it may be required to manually arrest the action of the shaft 2 by suitably actuating a dog or clutch 8, suitably pivoted in position and adapted to be engaged with or disengaged from said spring-metal plate or brake $5^a$ in any convenient way.

It will be noted that the plate or brake $5^a$ is sprung by the action of the dog 8, in turn acted by manually-operated rod 9 into engagement with the plate 5 and that in this instance the plate 5 is moved by said brake $5^a$ into engagement with the base-plate 1 in thus manually controlling or arresting the action of the governor, and accordingly through the shaft 2 the line or driving shaft of the machinery in connection with which the governor may be used.

I claim—

1. A device of the character described, comprising pivoted spring-connected weighted arms, a plate carried by said shaft, and upon which said arms are pivoted, a second plate arranged upon said shaft but uncontrolled thereby and engaged by the cam-ended portions of said arms and a spring-metal plate or brake effective for engagement with said second plate for arresting the action or motion of said driven shaft.

2. A device of the character described, comprising a driven shaft, a slidable plate movable upon said shaft, a plate fixed to said shaft and effective for engaging said slidable plate, centrifugally-actuated arms carried by the latter plate, a dog for actuating said brake and means for operating said dog.

In testimony whereof we affix our signatures in presence of two subscribing witnesses.

RUDOLPH C. BOWERS.
           LEWIS A. BERGER.

Witnesses:
     J. D. HIMMSEL,
     E. A. BROWN.